United States Patent Office 3,094,584
Patented June 18, 1963

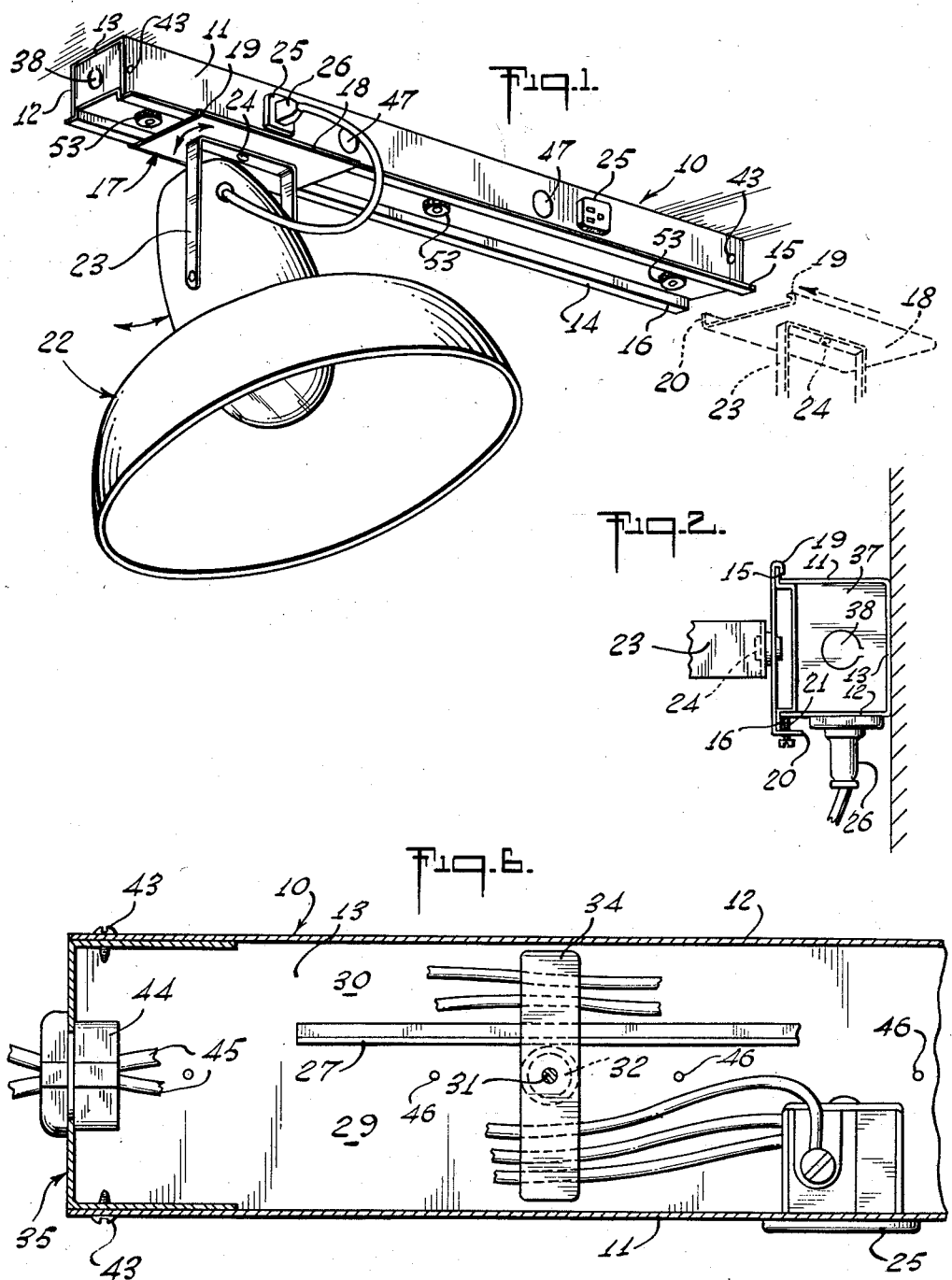

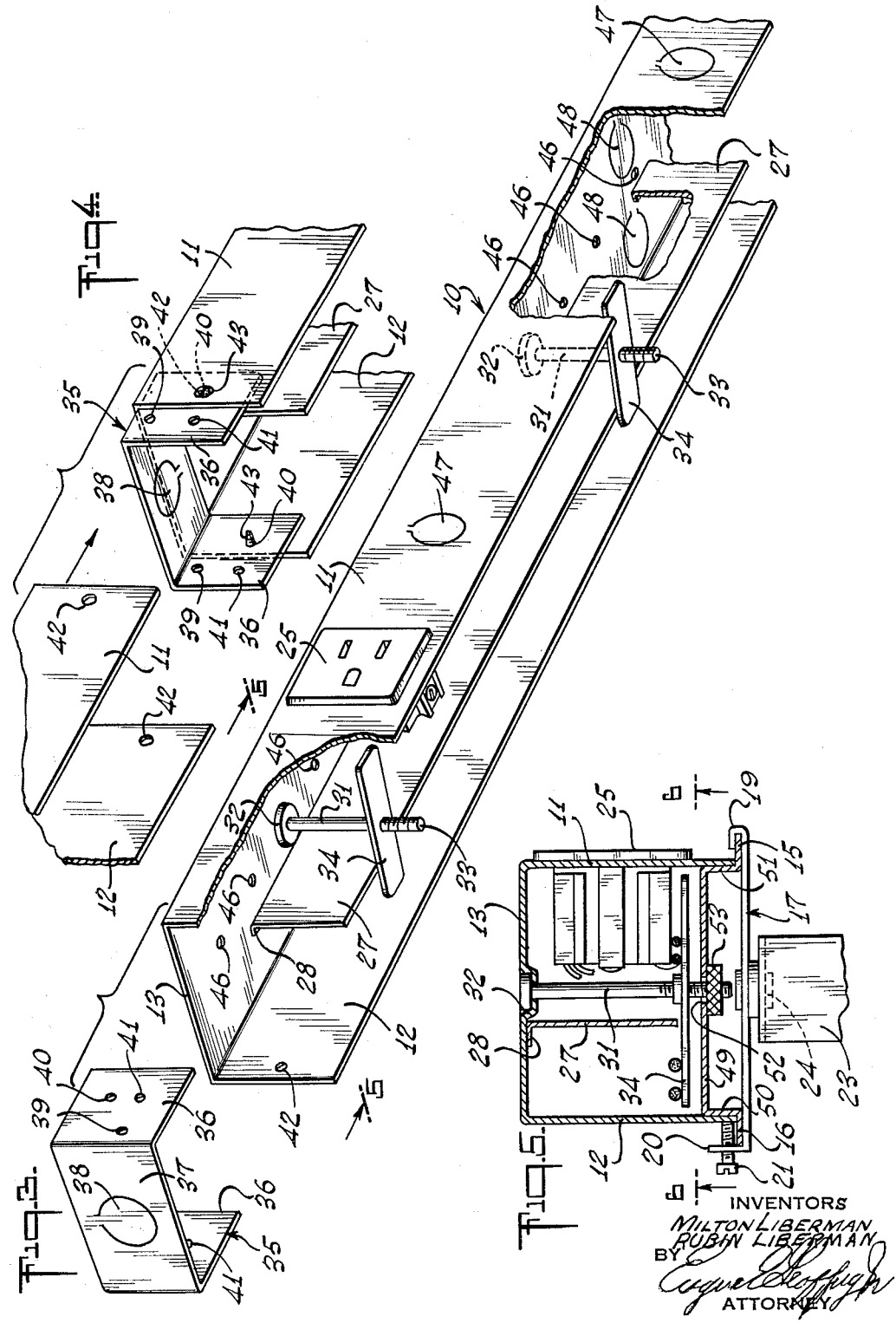

3,094,584
ADJUSTABLE SUPPORT FOR ELECTRIC FIXTURES
Milton Liberman, 65 Sewane Road, East Rockaway, N.Y., and Rubin Liberman, 308 E. 79th St., New York, N.Y.
Filed May 31, 1960, Ser. No. 37,547
3 Claims. (Cl. 174—59)

This invention relates to electric fixtures and more specifically to a novel and improved devices for adjustably supporting and energizing electric lighting and other similar devices.

The installation of electric lighting fixtures, particularly for commercial establishments and display windows presents numerous difficulties inasmuch as lighting requirements are often changed and the cost of modifying electrical installations is exceedingly expensive. This invention affords a novel and improved structure which not only facilitates the modification or adjustment of a lighting layout quickly and easily, but also incorporates means for handling power and other electrical cables that may be utilized for lighting or other purposes. In this way, unsightly surface mounted cables are avoided and yet such cables are readily accessible for modification and repair.

Another object of the invention resides in a novel and improved cable conduit and lighting support that is characterized by its simplicity, versatility and relatively low cost. By reason of an improved organization and arrangement of the elements forming this invention, any desired basic lighting arrangement utilizing single, as well as groups, of units may be attained.

A still further object of the invention resides in a novel and improved cable wire way and support for electric lighting and other electrical equipment.

The above and other objects of the invention will become more apparent from the following description and accompanying drawings forming part of this application.

In the drawings:

FIG. 1 is a perspective view of one embodiment of a lighting support and cable wire way in accordance with the invention;

FIG. 2 is an end view of the embodiment shown in FIG. 1;

FIG. 3 is a perspective view of the embodiment of the invention shown in FIG. 1 with the cover removed and portions broken away and displaced to illustrate the construction thereof;

FIG. 4 is a perspective view of end portions of supports in accordance with the invention preparatory to joining them in end to end relationship;

FIG. 5 is a cross-sectional view of the invention generally taken along the line 5—5 of FIG. 3 and with the cover and lighting support bracket in place; and FIG. 6 is a cross-sectional view of FIG. 5 taken along the line 6—6 thereof.

The invention broadly comprises a novel and improved wireway and lighting support which may be readily secured to ceiling or wall surfaces and includes adjustable mounts cooperating with the wireway for supporting and positioning lighting fixtures or other electrical equipment. The improved arrangement and coordination of elements forming the invention enables the wireway to be formed in individual sections or units which may be used independently or in integrated end to end relationship with other similar units. Moreover, the invention affords means for housing electric cables which may be used in connection with lighting installations or for other purposes and affords ready access to such cables for maintenance and repair.

Referring now to the drawings, one embodiment of a wireway and fixture support in accordance with the invention is shown generally in FIG. 1 and denoted by the numeral 10. It comprises generally a U-shaped structure having side walls 11 and 12, a bottom wall 13 and a removable cover plate 14. The cover plate 14 has outwardly extending longitudinal edge or flange portions 15 and 16 which receive a lighting fixture support generally denoted by the numeral 17. The support 17 comprises essentially a flat plate 18 having a reverse bend 19 formed along one edge thereof to engage and grip the flange 15 of the cover plate 14. The other edge of the plate 17 has a flanged portion 20 extending substantially at right angles to the plate 18 and this flanged portion includes machine screws 21 as shown in FIG. 2, extending through the flange 20 in threadable engagement therewith. These screws, when tightened, bear against the adjoining side wall of the U-shaped channel and engage the cover edge 16 to lock the support 17 in the desired position. The lighting fixture and associated supporting means may take any desired form and in this case, the lighting fixture, generally denoted by the numeral 22 is pivotally carried by a U-shaped bracket 23, the latter being pivotally secured to the plate 18 by a pivot 24.

The wireway and fixture support 10 as illustrated in FIG. 1 further includes a plurality of outlets 25 adapted to receive cooperating plugs such as the plug 26 for supplying energy to the lighting fixture 22.

FIGS. 2 through 6 illustrate the invention is greater detail and it will be observed that the U-shaped channel structure which includes the walls 11, 12 and 13 is provided with a shallow partition 27 secured to the wall 13 and extending outwardly in a direction substantially parallel to the side walls 11 and 12. The partition 27 is shallower than the walls 11 and 12 and may include a base flange 28 for the purpose of welding or otherwise fastening the partition in place. In the instant embodiment of the invention the partition 27 is somewhat shorter than the full length of the unit 10 in order to provide ample space for cable connectors, as will be shown.

From the description of the invention thus far, it is apparent that there is provided two separate wireways or longitudinal channels 29 and 30, as may be viewed more clearly in FIG. 6, with the raceway 29 being generally adapted for use in interconnecting the sockets or receptacles 25 and the wireway 30 for housing auxiliary cables that may be needed for lighting or other purposes. In order to insure retention of the cables within the actual raceways 29 and 30, the device is provided with a plurality of bolts 31 fixedly secured at 32 to the rear wall 13 of the structure 10 and having an outer threaded portion 33 to threadably receive the elongated wire retaining elements 34. The length of the elements 34 is substantially the width of the structure, as may be observed in FIG. 6, and these elements or wire retainers function to retain the cables and wiring within the respective wireways 29 and 30. Two or more of these retainers may be employed in a single unit as shown, for instance in FIG. 1 to retain the cables in place and prevent damage to the wiring when the cover members 14 are being secured in position.

The ends of the raceway and fixture support 10 are closed by U-shaped brackets generally denoted by the numeral 35. Each bracket includes a pair of legs 36 and a bridging member 37, the latter including a knockout 38 for attachment of electric cabling when desired. Each leg 36 includes at least three holes 39, 40 and 41, with the holes 39 being utilized with cooperating openings 42 in the walls 11 and 12 for fastening the closure 35 in position as shown in FIG. 1. If desired, the openings 39, 40 and 41 may be threaded to receive machine screws or may be arranged to receive sheet metal screws or other suitable fastening means. In FIG. 6, the closure 35 is shown in one position on the structure 10 with sheet metal screws 43 fastening the closure in place. In addition, the knockout 38 has been removed and a cable connector 44 has been secured in place. Electric wires extend through the connector and supply energy to the outlets or receptacles 25.

In order to connect two or more wireway and fixture support units one to the other in end to end relationship to form an elongated structure, the end closures 35 are removed from adjoining ends of the structures 10. One of the closures 35 is then rotated approximately 90 degrees from the position shown in FIG. 3 and is placed in one of the wireways 10, as illustrated in FIG. 4. Two of the screws 43 which were removed to displace the closure 35 are then utilized in cooperation with openings 40 in the closure 35 to hold the latter in position. The second wireway unit 10 to be joined to form a continuing structure is then placed flush against the end of the first wireway and screws are inserted through its set of openings 43 and threadably engaged with the openings 41 in the closure 35.

Any suitable means may be employed for securing the unit 10 to ceilings, walls or other supporting structures, though for convenience, openings 46 may be employed in the wall 13 for the receipt of screws or other suitable fastening means. In addition, knockouts 47 in the wall 11 of the unit 10 and 48 in the wall 13 may be provided to facilitate electrically connecting units one to the others when they are arranged in spaced relationship or for connection of branch circuits.

The cover member 14 is substantially the same length as the channel member comprising the walls 11, 12 and 13 and has a generally U-shaped cross section comprising a bottom wall 49 and side legs 50 and 51, the latter being slidably received between the walls 12 and 13. The outer ends of the legs 50 and 51 include outwardly extending flange or edge portions 16 and 15, respectively, for receiving and holding the lamp supporting bracket 17, as previously described. In normal installation the units 10 are secured to a vertical wall with the flange 15 positioned at the top. In this way, when the supports 17 are put in place, the rounded or reversely bent portion 19 is hooked over the flange 15 and will support the unit. The screws 21 will then function to prevent sidewise displacement or accidental disengagement of the support 17. However, inasmuch as the screws 21 are positioned in close proximity to the flange 16, when the units are mounted, the screws will hold the support 17 tightly against the cover plate 14 so that the mounts will be properly aligned with the channel supports 10.

The cover plates are held in position on the units 10 by means of the bolts 31 as previously described. In the instant embodiment of the invention three bolts 31 are displaced along the length of the unit 10 and the depressed cover portion 49 includes openings 52 registering with the bolts so that the threaded end portions 33 thereof may extend through the openings 52. Knurled nuts 53 threadably engage the ends of the bolts 31 and are tightened to hold the cover in place. The bolts 31 may, of course, be disposed in any desired manner along the wireway channels, though in certain cases it is advantageous to space them so that one bolt is centrally positioned and the other bolts are spaced from the ends of the channel a distance equal to half the distance between successive bolts. In this way, when units are placed in end to end relationship, one cover can be displaced to cover parts of two units and thus ensure alignment. Sections of covers would then be used on the ends of each length of combined units to complete the closure.

From the foregoing description, it is evident that this novel and improved wireway and appliance supporting structure affords substantial versatility and will greatly simplify the installation of lighting equipment, particularly in store windows and other areas where the position and placement of the lighting equipment must frequently be changed. The structures are relatively inexpensive and yet afford not only means for adjustably supporting various types of electrical equipment, but also provides means for handling auxiliary cabling that may be required in connection with lighting installations or for other purposes.

While only one embodiment of the invention has been illustrated and described, it is apparent that modifications, alterations and changes may be made without departing from the true scope and spirit thereof.

What is claimed is:

1. An adjustable electrical fixture support and wire way comprising an elongated generally U-shaped channel having a bottom wall and side walls, removable end closures on said channel, each of said closures being of generally U-shaped configuration and secured to the side walls of said channel, an elongated cover member having side edges extending beyond said side walls, an adjustable mount having means engaging the side edges of said cover and means carried by the adjustable mount for supporting an electrical fixture, said cover member having a depressed central portion extending throughout the length of said cover and means carried by said bottom wall and engaging cooperating openings in said depressed portion for fastening the cover in position on said channel, said depressed portion effecting alignment of the cover and channel.

2. An adjustable fixture support according to claim 1 wherein at least two fastening means are provided and the distance of each fastening means to the adjoining end of said channel is equal to one-half the distance between adjoining fastening means.

3. An adjustable electrical fixture support and wire way comprising an elongated, generally U-shaped channel having a bottom wall and side walls, removable end closures on said channel, each of said closures secured to an end of said channel, an elongated cover member having side edges extending beyond said side walls, a plurality of externally accessible spaced electrical outlets carried by at least one wall of said channel, an adjustable mount having means engaging the side edges of said cover, means carried by the adjustable mount for supporting an electrical fixture, said cover having a depressed central portion extending throughout the length of the cover and having spaced openings therein, means carried by the bottom wall of said channel and engaging the last said openings for fastening the cover in position on said channel, said depressed portions effecting alignment of the cover and channel, and an electrical plug and cable connected to said fixture, said plug removably engaging an outlet.

References Cited in the file of this patent

UNITED STATES PATENTS

| | | |
|---|---|---|
| 1,106,103 | Lutz | Aug. 4, 1914 |
| 1,839,250 | Newman et al. | Jan. 5, 1932 |
| 1,979,804 | Lutz | Nov. 6, 1934 |
| 2,088,845 | De Mask | Aug. 3, 1937 |
| 2,288,941 | Curtis | July 7, 1942 |
| 2,572,218 | Turton | Oct. 23, 1951 |
| 2,641,636 | Born et al. | June 9, 1953 |
| 2,696,533 | Hammerly et al. | Dec. 7, 1954 |
| 2,698,925 | Taylor | Jan. 4, 1955 |
| 2,790,894 | Zingone | Apr. 30, 1957 |
| 2,905,806 | Tunney | Sept. 22, 1959 |
| 3,021,499 | Rascati | Feb. 13, 1962 |

FOREIGN PATENTS

| | | |
|---|---|---|
| 139,531 | Australia | Nov. 24, 1950 |
| 220,665 | Australia | Feb. 27, 1959 |
| 773,621 | Great Britain | May 1, 1957 |